J. A. WHITWORTH.
AUXILIARY SEEDING ATTACHMENT FOR PLANTERS.
APPLICATION FILED DEC. 16, 1916.
1,237,986.
Patented Aug. 21, 1917.
2 SHEETS—SHEET 1.
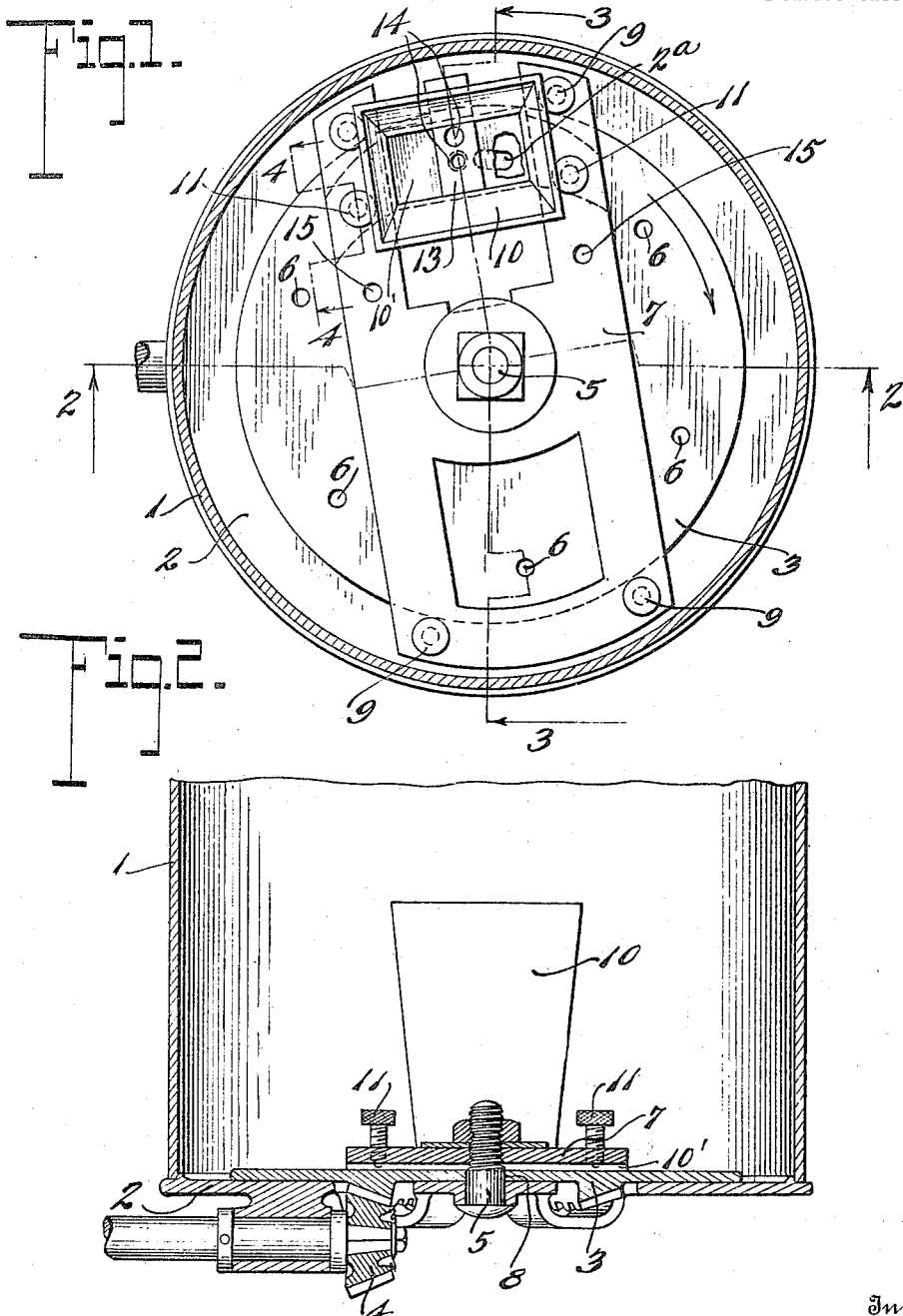
Witness
E. H. Wagner
Inventor
J. A. Whitworth
By Robert Cobb
Attorneys J. A. WHITWORTH.
AUXILIARY SEEDING ATTACHMENT FOR PLANTERS.
APPLICATION FILED DEC. 16, 1916.
1,237,986.
Patented Aug. 21, 1917.
2 SHEETS—SHEET 2.
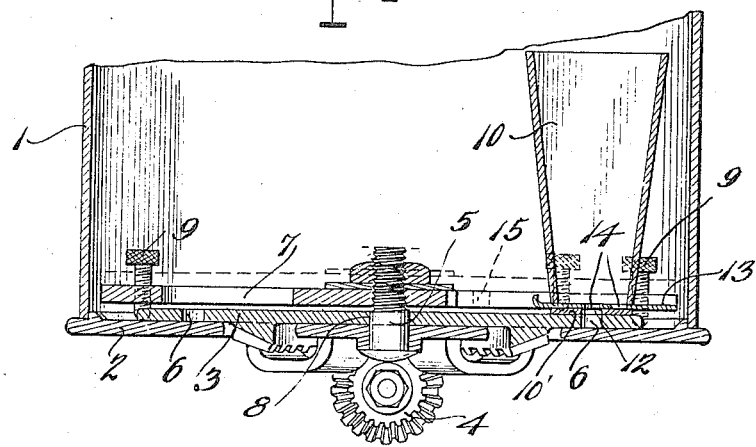
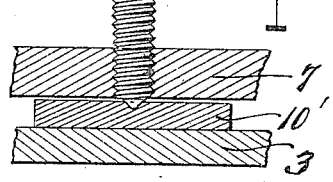
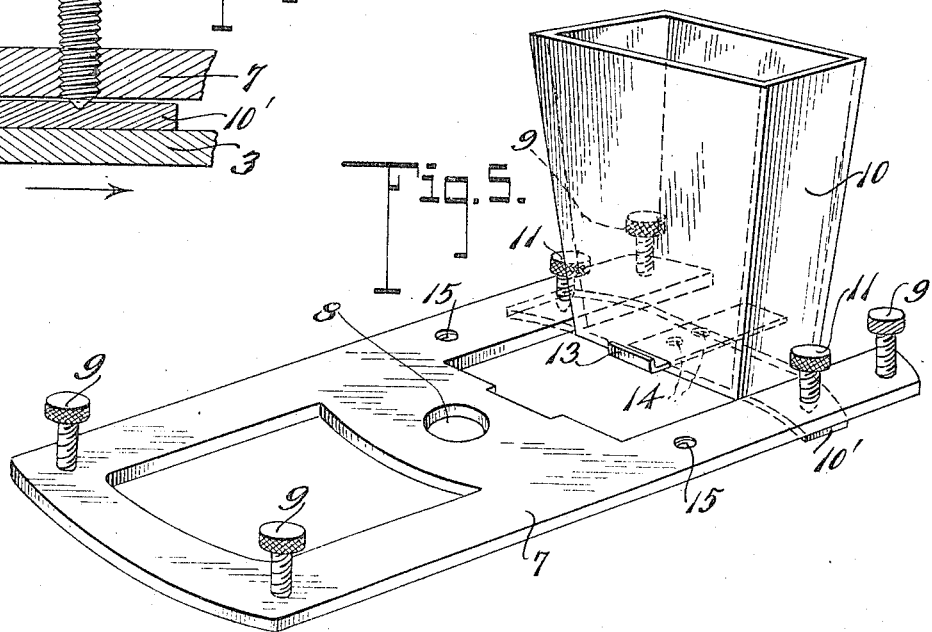
Witness
C. H. Wagner
Inventor
J. A. Whitworth
By Robb & Robb
Attorneys

UNITED STATES PATENT OFFICE.

JOHN ALLEN WHITWORTH, OF BANQUETE, TEXAS.

AUXILIARY SEEDING ATTACHMENT FOR PLANTERS.

1,237,986.  Specification of Letters Patent.  Patented Aug. 21, 1917.

Application filed December 16, 1916. Serial No. 137,427.

*To all whom it may concern:*

Be it known that I, JOHN ALLEN WHITWORTH, a citizen of the United States, residing at Banquete, in the county of Nueces and State of Texas, have invented certain new and useful Improvements in Auxiliary Seeding Attachments for Planters, of which the following is a specification.

The present invention has for its primary object the provision of an attachment for agricultural machines commercially known as seed planters, such as are employed for the planting of corn, cotton seed or the like, and is designed to enable the use of the same mechanism for planting of seed of a much smaller nature than those referred to, such as cabbage, onions, or similar seed.

For a clear understanding of the function of my invention, it may be stated that apparatus of the type above referred to consist generally of a hopper of sufficient size to hold a quantity of seed, and feeding mechanism by which said seed is distributed as the machine is operated over the ground and in the adaptation of the apparatus to perform the additional planting functions which I contemplate, I simply provide an auxiliary hopper or receptacle of a smaller capacity, preferably subject to disposition within the regular or main hopper, with means for adjusting said auxiliary hopper in relation to the feeding mechanism so that the finer seed from said hopper will be properly distributed by this same feeding mechanism.

It is further comprehended by my invention to provide means for regulating the quantity of seed which is supplied from the auxiliary hopper to the feeding mechanism aforesaid.

For a full understanding of the present invention, reference is to be had to the following description, and the accompanying drawings, in which:

Figure 1 is a horizontal sectional view through the main hopper of a planter and showing the disposition of my invention within the same.

Fig. 2 is a vertical sectional view on the line 2—2 of Fig. 1.

Fig. 3 is a similar sectional view on the line 3—3 of Fig. 1.

Fig. 4 is an enlarged fragmentary sectional view taken on the plane indicated by the line 4—4 of Fig. 1, showing more clearly the coaction of a clamping member for holding the auxiliary hopper in proper position.

Fig. 5 is a perspective view of my invention complete.

Throughout the following detail description, and on the several figures of the drawings, similar parts are referred to by like reference numerals.

Specifically describing the apparatus which includes my invention, 1 designates a main hopper of the planting apparatus with which my invention is used, said hopper being provided with a bottom plate 2 and a feed plate 3 disposed thereon for distributing seed from said hopper through operating mechanism indicated generally by the reference character 4. I desire it to be particularly noted that the seeding mechanism is only conventionally shown in the drawing and this in actual commercial machines differs according to the type manufactured by different manufacturers but in general these mechanisms have elements in common such as have been referred to above. The feed plate 3, as will be apparent is rotatably mounted on the central clamping bolt 5 which extends through the spiderlike central portion of the bottom 2 of the main hopper. Said plate furthermore is provided adjacent to its periphery with a series of feed apertures 6 into which the seed fall for selective distribution in the customary manner.

It is with this conventional mechanism that my attachment is designed to coöperate and by reference to Fig. 5 of the drawings, said attachment comprises mainly the frame or supporting plate 7 which is of rectangular construction and provided with a central aperture 8 to receive the bolt 5 extending through the bottom of the main hopper and said bolt furthermore secures the plate in fixed relation to the main hopper bottom when the nut of said bolt is sufficiently tightened to accomplish this result.

Inasmuch as my invention is adapted for use with different types of seed planters, it is requisite that provision be made for the proper adjustment of the support 7 with relation to the feed mechanism of the different types. This is primarily obtained by the use of set or adjusting screws 9 which extend through the corners of the supporting plate 7 and are adapted to contact with the bottom of the main hopper adjacent the periphery thereof so that said support is subject to adjustment toward or from the feed plate 3 according to the thickness of the material of the same. The supporting plate 7 carries adjacent to one end the auxiliary hopper or receptacle 10 which is, of course, generally of much smaller capacity than the main hopper in which it is disposed. Said hopper is subject to adjustment on the plate 7 toward or from the center thereof as will now be described. The bottom 10' of the hopper extends laterally from the sides of the same a suitable distance to project beneath the supporting plate 7 and set screws 11 extend through the sides of said support into contact with the lateral extensions of the hopper bottom, as shown in Fig. 4 of the drawing, the said extensions being preferably countersunk as indicated in Fig. 4 to receive the extremities of the adjusting screws 11.

As inferred from the foregoing description, the adaptation of this invention to the different types of seeding mechanism is secondarily provided for by the adjustment of this auxiliary hopper inwardly or outwardly of its support so as to bring it into proper relation with the feeding apertures or notches of the feed plate of the main hopper, the feeding plates being generally of different diameters. The bottom of the hopper 10, as shown in Fig. 5 is provided centrally with an outlet aperture 12 and the hopper with its support is so located in the main hopper that the feed aperture 12 will lie slightly to one side of the feed aperture 2ª in the bottom of the main hopper with which the feed apertures 6 of the feeding plate register during the rotation of the same. Obviously the seed from the auxiliary hopper will fall upon the feeding plate and when the first aperture 6 of the same passes beneath the auxiliary hopper a predetermined amount of the seed will be carried to the opening 2ª and allowed to pass from the seeding apparatus.

It is desirable to control the quantity of seed which is fed from the auxiliary hopper as may be required by the different characters of seed which are distributed and for this purpose I provide an adjustable slide or valve 13 which has apertures 14 therethrough of different sizes, said apertures being subject to registration with the aperture in the bottom of the hopper by shifting the plate laterally through the gripping of the flanged extremity 13'. This valve is also used to close the outlet when the auxiliary hopper is used.

Where the diameter of the feed plate 3 of the feeding mechanism of the seeding apparatus is smaller than that shown in Fig. 1, the auxiliary hopper must be moved inwardly of the supporting plate 7, and to enable this to be done the screws 11 are removed and placed in suitable threaded apertures 15 nearer the center of the plate, whereupon the hopper is moved inwardly until the lateral extensions of the bottom lie beneath said apertures 15. The screws 11 are then adjusted into contact with the lateral extensions and sufficient pressure exerted thereupon to prevent displacement of the hopper by the frictional contact of the feeding plate directly beneath the same therewith. Any number of adjustments of this character may be obtained by providing a sufficient number of apertures 15 as may be required in the adaptation of this invention to different types of machines.

The utility of the invention will be obvious from the foregoing description. It enables the use of a machine which is generally adapted for the planting of one kind of seed for the sowing of seed of a very small character and yet controlling the distribution of said small seed with the feeding mechanism which is employed for the large seed. This increase of utility of an apparatus which is expensive is extremely desirable since it dispenses with the necessity for securing duplicated types of machines for performing substantially the same function of seeding of grain, or vegetable seed as the case may be.

Having thus described my invention, what I claim as new is:

1. The combination with a seed planter of the class described comprising a hopper and feeding mechanism, of an auxiliary hopper adapted to be disposed within the planter hopper aforesaid, and means for adjusting the hopper with respect to said feeding mechanism whereby to effect distribution of the contents of the auxiliary hopper under control of the main hopper feeding mechanism.

2. The combination with a seed planter of the class described comprising a hopper and feeding mechanism therefor, of an auxiliary seed distributing attachment adapted for disposition in coöperative relation to the feeding mechanism aforesaid, said attachment comprising a hopper, a support therefor, and means for adjustably holding said support in position to deliver the contents of the attachment hopper to the feeding mechanism for distribution of said contents under the control of the latter.

3. The combination with a seed planter of the class described comprising a hopper and feeding mechanism therefor, of an auxiliary hopper, a support therefor adapted to be disposed within the main hopper aforesaid, means for holding said support in fixed relation to the main hopper, and means for adjusting the auxiliary hopper with respect to the feeding mechanism whereby to effect distribution of the contents of said auxiliary hopper under control of the main hopper feeding mechanism.

4. The combination with a seed planter of the class described comprising a hopper and feeding mechanism therefor, of an auxiliary hopper, a support therefor adapted to be disposed within the main hopper aforesaid, means for holding said support in fixed relation to the main hopper, means for adjusting the auxiliary hopper with respect to the feeding mechanism whereby to effect distribution of the contents of said auxiliary hopper, and means for controlling the feed of the contents from the auxiliary hopper to the feeding mechanism.

5. The combination with a seed planter of the class described comprising a hopper and feed mechanism therefor including a revoluble feed plate, and means for holding said plate, of an auxiliary seeding attachment comprising a hopper arranged within the main hopper and a support with which the holding means aforesaid coacts to hold said support in fixed relation to the main hopper, and means for adjustably holding said support in coöperative position with respect to the feeding mechanism.

6. The combination with a seed planter of the class described comprising a hopper and feed mechanism therefor including a revoluble feed plate, and means for holding said plate, of an auxiliary seeding attachment comprising a hopper arranged within the main hopper and a support with which the holding means aforesaid coacts to hold said support in fixed relation to the main hopper, means for adjustably holding said support in coöperative position with respect to the feeding mechanism, and means for adjusting said auxiliary hopper on said support toward or from the holding means aforesaid.

7. An auxiliary seeding attachment for planters comprising a supporting plate, adjusting screws carried by said plate for regulating the adjustment of the support, a hopper carried by said support and comprising extensions coacting with said supporting plate, and adjusting screws carried by said supporting plate for coöperation with the extensions aforesaid to hold the hopper in adjusted position on said plate.

In testimony whereof I affix my signature.

JOHN ALLEN WHITWORTH.